United States Patent [19]

Girgenti et al.

[11] 4,219,432

[45] Aug. 26, 1980

[54] STABILIZED AMIDE-IMIDE GRAFT OF ETHYLENE COPOLYMERIC ADDITIVES FOR LUBRICANTS

[75] Inventors: Salvatore J. Girgenti, Westfield; John B. Gardiner, Mountainside, both of N.J.

[73] Assignee: Exxon Research & Engineering Co., Florham Park, N.J.

[21] Appl. No.: 12,068

[22] Filed: Feb. 14, 1979

[51] Int. Cl.$^2$ .............................................. C10M 1/32
[52] U.S. Cl. ............................... 252/51.5 A; 525/285; 525/301; 525/374; 525/375; 525/379; 525/382; 525/386
[58] Field of Search ................... 252/51.5 A; 525/285, 525/301, 374, 375, 379, 382, 386

[56] References Cited

U.S. PATENT DOCUMENTS

| | | | |
|---|---|---|---|
| 3,687,905 | 8/1972 | Dorer | 252/51.5 A X |
| 4,063,010 | 12/1977 | Marie et al. | 252/51.5 A X |
| 4,089,794 | 5/1978 | Engel et al. | 252/51.5 A |
| 4,098,710 | 7/1978 | Elliott et al. | 252/51.5 A |
| 4,137,185 | 1/1979 | Gardiner et al. | 252/51.5 A X |
| 4,144,181 | 3/1979 | Elliott et al. | 252/33 |
| 4,152,276 | 5/1979 | Jackisch | 252/51.5 A |
| 4,152,499 | 5/1979 | Boerzel et al. | 252/51.5 A X |
| 4,160,739 | 7/1979 | Stambaugh et al. | 252/51.5 A X |
| 4,161,452 | 7/1979 | Stambaugh et al. | 252/51.5 A X |

*Primary Examiner*—Andrew Metz
*Attorney, Agent, or Firm*—Roland A. Dexter; Frank T. Johmann

[57] ABSTRACT

Oil-soluble, derivatized ethylene copolymers derived from about 2 to 98 wt. % ethylene, and one or more $C_3$ to $C_{28}$ alpha-olefins, e.g. propylene, which are grafted, preferably solution-grafted under an inert atmosphere and at elevated temperatures and in the presence of a high-temperature decomposable free-radical initiator, with an ethylenically-unsaturated dicarboxylic acid material and thereafter firstly reacted with from 0.1 to 0.9 molar equivalents of a t-amino-amine compound containing only one primary amino group to form imido groups and then secondly reacted with from 0.1 to 0.9 molar equivalents of a $\alpha,\omega$ primary diamine having at least two primary amine groups, e.g. a poly(alkylene amine) such as diethylene triamine, to form carboxyl-grafted polymeric imide, usually succinimide, intermediate and thirdly reacted with an anhydride of a $C_1$–$C_{30}$ hydrocarbon substituted acid, preferably acetic anhydride, to yield an oil-soluble stable amide derivative of said polyamine whereby oil solutions of said amide derivative are characterized by minimal viscosity change over an extended period of time. Useful number average molecular weight ($\overline{M}_n$) of said copolymers range from about 700 to 500,000; however, if the molecular weight is from 10,000 to 500,000 then these copolymers are multifunctional viscosity index improvers of enhanced sludge dispersant activity. It is preferred to treat these derivatized copolymers with oil-soluble hydrocarbyl substituted acids, preferably with long chain alkylaryl sulfonic acids with an average side chain carbon number of about 20–40, to yield haze-free hydrocarbon concentrate useful as an additive solution for lubricating oils.

6 Claims, No Drawings

STABILIZED AMIDE-IMIDE GRAFT OF ETHYLENE COPOLYMERIC ADDITIVES FOR LUBRICANTS

BACKGROUND OF THE INVENTION

1. Field of the Invention

This invention relates to stable polymeric dispersant additives for lubricating oils which may also be useful as viscosity-index improvers for lubricating oils. More particularly, this invention relates to viscosity stable solutions of substantially saturated polymers comprising ethylene and one or more $C_3$ to $C_{28}$ alpha-olefins, preferably propylene, which have been grafted in the presence of a free radical initiator with an ethylenically-unsaturated dicarboxylic acid material preferably at an elevated temperature and in an inert atmosphere, and thereafter reacted partially with a tertiary amino-amine compound having but one primary amino group and then fully with a $\alpha,\omega$ primary diamine having two primary amino groups, such as diethylene triamine, and then with an anhydride of an organic acid, to form multifunctional polymeric reaction products characterized by viscosity stabilizing activity in mineral oil solutions.

2. Description of the Prior Art

Ashless dispersants or detergents for lubricating oil compositions are well known to enhance the sludge dispersing ability of said compositions.

One type of dispersant is generally derived from a hydrocarbon substituted dicarboxylic acid material such as an alkenyl succinic acid or anhydride reacted with a nitrogen-containing material. United Kingdom Pat. No. 1,018,982 teaches of reacting said alkenyl succinic anhydride with a 2-imidazoline or pyrimidine (the latter is obtained from the reaction of a carboxylic acid, e.g. acetic acid and an alkylene polyamine, e.g. diethylene triamine) to provide a sludge dispersant for lubricating oils. Similarly, U.S. Pat. No. 3,415,750 teaches of polyalkenyl succinicimido imidazolines and bis-imidazolines which can be used as said ashless detergents. The imidazoline is first prepared by the reaction of a polyethylene polyamine with a carboxylic acid or its anhydride, e.g. acetic which product is thereafter reacted with a polyalkenyl succinic anhydride.

In contrast to the above, U.S. Pat. No. 3,216,936 teaches that it is advantageous to insure that the reaction product of a mixture of a hydrocarbon-substituted succinic acid, a monocarboxylic acid and an alkylene polyamine does not come from an intermediate reaction product of said monocarboxylic acid and said amine in order to avoid destroying the sludge dispersant activity of the final reaction product.

It is well known that the introduction of carboxylic acid groups onto ethylene copolymers provides a means for derivatizing said copolymers which have viscosity index (V.I.) improving activity when dissolved in mineral oils. One means of introducing the carboxylic groups is by grafting of maleic anhydride onto said polymer as by a free radical mechanism.

Belgian Pat. No. 843,360 corresponding to U.S. Pat. No. 4,089,794 teaches the production of soluble, sludge-dispersing additives for hydrocarbon fuels and lubricating oils by the free-radical induced grafting in solution of an ethylenically-unsaturated dicarboxylic acid material such as maleic anhydride onto a substantially saturated copolymer comprising ethylene and at least one other alpha-olefin at an elevated temperature to provide, without substantial polymer degradation, a useful precursor copolymer which can be subsequently reacted with a carboxylic acid reacting polyfunctional material, such as a polyamine or a hydroxyamine or mixtures of these, to form multifunctional polymeric imidated derivatives having particular utility as engine sludge and varnish control additives for lubricating oils.

It is an object of this invention to provide a grafted ethylene copolymeric dispersant, generally useful as a mineral oil viscosity index improver of useful sludge performance and enhanced viscosity stabilizing activity.

SUMMARY OF THE INVENTION

U.S. Pat. No. 4,137,185 filed July 28, 1977, of common assignee with this application teaches that the reaction of the organic acid anhydrides, e.g. acetic anhydride, provides amide derivatization of any primary amino groups of the imidated ethylene copolymer whereby viscosity stabilizing activity is provided to said copolymers. The aforesaid reaction can be considered a process for improving the viscosity stabilization of an oil additive concentrate comprising a hydrocarbon solvent, from 0.1 to 50 wt.% based on the total weight of said concentrate of an imidated grafted ethylene $C_3$–$C_{28}$ $\alpha$-olefin copolymeric viscosity index improver having a molecular weight ($\overline{M}_n$) of 700 to 500,000 comprising the step of reacting said concentrate with a hydrocarbon substituted acid anhydride wherein the hydrocarbon constituent has from about 1 to 30, preferably 1 to 18 carbons by adding said acid anhydride in about 0.5-2.5, preferably 1-1.5, moles per primary amino group of said concentrate and maintaining said concentrate at a temperature ranging from about 50° to about 250° C., preferably 100° to 200° C., and for a period of 0.25 to 8, preferably 0.5 to 3 hours. The reaction appears to be an acylation of pendant free primary amino group to provide an amide structure which limits the multifunctional copolymers property of solution chain extension thereby inhibiting viscosity increase of oil solutions containing the additives.

It has now been discovered that viscosity stabilization can be retained in the copolymers claimed in said U.S. Pat. No. 4,137,185 when from 0.1 to 0.9 molar equivalent of a tertiary-amino-amine compound having one primary amino group (based on grafted dicarboxylic acid groups) is reacted with said grafted copolymer after which said copolymer is fully derivatized, i.e. sequentially imidated and then amidated according to the teachings of said U.S. Pat. No. 4,137,185 with the surprising result of enhanced dispersant activity.

In accordance with this invention, there is provided a composition comprising a lubricating oil having dissolved therein at least a viscosity index improving amount of an oil-soluble $C_1$ to $C_{30}$ hydrocarbyl amide of an alkylene (preferably amino), t-amino alkylene-imidocarboxyl grafted ethylene polymeric viscosity index improver containing from 0.001 to 8 wt.% of nitrogen, said t-amino alkylene-imido groups being from 10% to 90% of all said carboxyl groups and said grafted carboxyl groups ranging from 2 to 20, preferred 4 to 16, average per ethylene copolymer molecule.

Finally to enhance the freedom from haze of the mineral oil solutions, the mineral oil compositions containing the additives of the invention can be further reacted with an oil-soluble hydrocarbyl substituted acid having from 9 to 76 total carbon atoms having a pK of less than 2.5, preferably a polymethylene substituted benzene sulfonic acid, said polymethylene substituted having from 18–40, optimally 24 to 32 carbons, in an amount of from about 0.01 wt.% to 8 wt.% at a temperature within the range of about 150° C. to about 200° C. and for a period from about 0.1 hour to about 20 hours, e.g. for 1 hour at 190° C. This further step results in an additive oil composition of improved viscosity stability and no visually perceptible haze.

Thus, this invention also relates to the novel graft ethylene copolymeric derivatized compositions of the amide-imide, preferably succinimide, type as well as lubricants containing these copolymers prepared as described herein.

DETAILED DESCRIPTION OF THE PRESENT INVENTION CARBOXYLIC GRAFTING OF ETHYLENE COPOLYMERS

The Ethylene Copolymer

The ethylene copolymers to be grafted contain from about 2 to about 98, preferably 30 to 80 wt.% of ethylene, and about 2 to 98, preferably 20 to 70, wt.% of one or more $C_3$ to $C_{28}$, preferably $C_3$ to $C_{18}$, more preferably $C_3$ to $C_8$, alpha-olefins, e.g. propylene. Such copolymers preferably have a degree of crystallinity of less than 25 wt.%, as determined by X-ray and differential scanning calorimetry, and a number average molecular weight ($\overline{M}_n$) in the range of about 700 to about 500,000, preferably 10,000 to 250,000, as determined by vapor phase osmometry (VPO) or membrane osmometry. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene; also branched chain alpha-olefins, such as 5-methylpentene-1 and 6-methylheptene-1 and mixtures thereof.

Terpolymers of ethylene, said alpha-olefin and a nonconjugated diolefin or mixtures of such diolefins may also be used. The amount of the nonconjugated diolefin ranges from about 0.5 to 20 mole percent, preferably about 1 to about 7 mole percent, based on the total amount of ethylene and alpha-olefin present. Representative diolefins include cyclopentadiene, 2-methylene-5-norbornene, nonconjugated hexadiene, or any other alicyclic or aliphatic nonconjugated diolefin having from 6 to 15 carbon atoms per molecule, such as 2-methyl or ethyl norbornadiene, 2,4-dimethyl-2-octadiene, 3-(2-methyl-1-propane) cyclopentene, ethylidene norbornene, etc.

These ethylene copolymers, this term including terpolymers, may be prepared using the well-known Ziegler-Natta catalyst compositions.

Such polymerization may be effected to produce the ethylene copolymers by passing 0.1 to 15, for example, 5 parts of ethylene; 0.05 to 10, for example, 2.5 parts of said higher alpha-olefin, typically propylene; and from 10 to 10,000 parts of hydrogen per million parts of ethylene; into 100 parts of an inert liquid solvent containing (a) from about 0.0017 to 0.017, for example, 0.0086 parts of a transition metal principal catalyst, for example, $VOCl_3$; and (b) from about 0.0084 to 0.084, for example, 0.042 parts of cocatalyst, e.g. $(C_2H_5)_3Al_2Cl_3$; at a temperature of about 25° C. and a pressure of 60 psig for a period of time sufficient to effect optimum conversion, for example, 15 minutes to one-half hour; all parts being parts by weight.

Ethylenically Unsaturated Carboxylic Acid Materials

These materials which are grafted (attached) onto the copolymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred as it does not appear to homopolymerize appreciably but grafts onto the ethylene copolymer or terpolymer to give two carboxylic acid functionalities. Such preferred materials have the generic formula

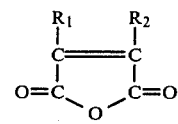

wherein $R_1$ and $R_2$ are hydrogen or a halogen and O is oxygen. Suitable examples additionally include chloromaleic anhydride, itaconic anhydride, or the corresponding dicarboxylic acids, such as maleic acid or fumaric acid or their monoesters.

Grafting of the Polymer

The free-radical induced grafting of ethylenically unsaturated carboxylic acid materials in solvents, such as benzene is known in the art (see U.S. Pat. No. 3,236,917). The grafting according to the process of this invention is carried out at an elevated temperature in the range of about 100° C. to 250° C., preferably 120° to 190° C., and more preferably 150° to 180° C., e.g. above 160° C., in a solvent, preferably a mineral lubricating oil solution containing, e.g. 1 to 50, preferably 5 to 30 wt.%, based on the initial total oil solution, of the ethylene polymer and preferably under an inert environment. The grafting is carried out in the presence of a high-temperature decomposable compound capable of supplying free radicals at said elevated temperature.

The free-radical initiators which may be used are peroxides, hydroperoxides, and azo compounds and preferably those which have a boiling point greater than about 100° C. and decompose thermally within the grafting temperature range to provide said free radicals. Representative of these free-radical initiators are azobutyronitrile and 2,5-dimethyl-hex-3-yne-2,5 bis-tertiary-butyl peroxide, commercially sold as Lupersol 130 or its hexane analogue. The initiator is used at a level of between about 0.005% and about 1%, based on the total weight of the polymer solution.

The ethylenically unsaturated carboxylic acid material, e.g. maleic anhydride, is used in an amount ranging from about 0.01% to about 10%, preferably 0.1 to 2.0%, based on the weight of the initial total oil solution. The aforesaid carboxylic acid material and free radical initiator are used in a weight percent ratio range of 1.0:1 to 30:1, preferably 2.0:1 to 7:1, more preferably 3.0:1 to 6:1.

The grafting is preferably carried out in an inert atmosphere, such as by nitrogen blanketing. While the grafting can be carried out in the presence of air, the yield of the desired graft polymer is decreased as compared to grafting under an inert atmosphere. The inert environment should be substantially free of oxygen. The grafting time ranges from about 0.1 to 12 hours, preferably from about 0.5 to 6 hours, more preferably 0.5 to 3 hours. The graft reaction is carried out to at least approximately 4 times, preferably at least about 6 times the half-life of the free-radical initiator at the reaction temperature employed, e.g. with 2,5-dimethyl hex-3-yne-2,5-bis(t-butyl peroxide) 2 hours at 160° C. and one hour at 170° C.

In the grafting process, the copolymer solution is first heated to grafting temperature and thereafter said carboxylic acid material and initiator are added with agitation although they could have been added prior to heating. When the reaction is complete, the excess acid material is eliminated by an inert gas purge, e.g. nitrogen sparging.

In the grafting step, the maleic anhydride or other carboxylic acid material used is grafted onto both the polymer and the solvent for the reaction. The wt.% grafted onto the polymer is normally greater than the amount grafted onto the oil due to greater reactivity of the polymer to grafting. However, the exact split between the two materials depends upon the polymer and its reactivity, the reactivity and type of oil, and also the concentration of the polymer in the oil. The split can be measured empirically from the infrared analyses of product dialyzed into oil and polymer fractions and measuring the anhydride peak absorbance in each.

The grafting is preferably carried out in a mineral lubricating oil which need not be removed after the grafting step but can be used as the solvent in the subsequent reaction of the graft polymer with the polyfunctional material and as a solvent for the end product to form the concentrate.

The oil having attached, grafted carboxyl, e.g. maleic anhydride, groups will when reacted with the several amines, also be converted to the corresponding derivatives. If desired, the split between the imidated graft polymer and the imidated graft oil can be determined by dialysis into polymer and oil fractions and infrared or nitrogen analysis of the fractions.

The solution grafting step when carried out in the presence of a high temperature decomposable peroxide is accomplished without degradation of the chain length (molecular weight) of the ethylene-containing polymer. Measurement of molecular weights and degradation can be evaluated by determination of the thickening efficiency of the polymer.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{M}_n$) and is a convenient, useful measurement for formulation of lubricating oils of various grades.

TERTIARY-AMINO-AMINE COMPOUNDS

Useful tertiary-amino-amine compounds for initial reaction with the grafted ethylene copolymers are those which have only one primary amino group, i.e. only one group to react with the dicarboxylic acid moiety to form the imido linkage. Such t-amino-amine compounds include heterocyclic structures such as imidazolines, morpholines, piperazines, piperadines and the like. The acyclic amine compounds contain 2 to 60, e.g. 3 to 20, total carbon atoms and 2 to 12, preferably 2 to 6 nitrogen atoms in the molecule can be represented by the formula

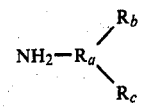

wherein $R_a$ represents an alkylene containing group, i.e. a group containing at least one $(CH_2)_s$ moiety wherein s represents a number of from 2 to 6 and $R_b$ and $R_c$ which may be the same or different are $C_1$ and $C_{10}$ alkyls, e.g. dimethyl amino propyl amine.

Preferred are the heterocyclic nitrogen compounds such as imidazolines, N-amino alkylmorpholines and N-amino-alkyl piperazines of the general formula:

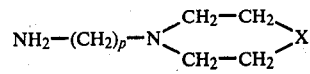

wherein X is O or N-G, G is an alkyl group of from 1 to 3 carbon atoms and p is an integer of from 1 to 4. Examples of such amines include N-(2-aminoethyl) (4-ethyl) piperazine, N-(3-aminopropyl) (4-ethyl) piperazine, N-(3-aminopropyl) morpholine and methyl amino pyridine.

α,ω DI-PRIMARY AMINE COMPOUNDS

The imidated grafted ethylene-containing polymer is then reacted with α,ω di-primary amines which have two primary amino groups (hereafter designated α,ω diamines), i.e. one group to react with the dicarboxylic acid moiety to form the imido linkage and one more group to react with the organic acid anhydride whereby an amide is formed. Such α,ω diamines can be represented by the formula

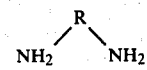

wherein R represents an alkylene group, an alkylene imino group, a hydrocarbyl group, a saturated ring structure, an unsaturated ring structure or a nitrogen containing heterocyclic ring structure. The useful α,ω diamines include those having from 2 to 60, e.g. 3 to 20, total carbon atoms and from 2 to 12, e.g. 2 to 6 nitrogen atoms in the molecule, which amines may be hydrocarbyl α,ω diamines or the hydrocarbyl substituent can include other groups, e.g., cyano groups, amide groups, imidazoline groups, and the like. Preferred amines are aliphatic saturated alkylene polyamines, including those of the general formula:

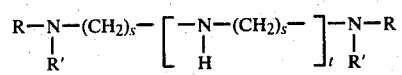

wherein R and R' are independently selected from the group consisting of hydrogen, amino alkylene radicals, and $C_1$ to $C_{12}$ alkylamino $C_2$ to $C_6$ alkylene radicals, s is a number of from 2 to 6, preferably 2 to 4, and t is a number of from 0 to 10, preferably 2 to 6.

Examples of suitable α,ω diamines include ethylene diamine, diaminomethane, 1,3-diaminopropane, 1,4-diaminobutane, 1,6-diaminohexane, diethylene triamine, triethylene tetraamine, tetraethylene pentamine, 1,2-propylene diamine, di-(1,2-propylene) triamine, di-(1,3-propylene) triamine, di-(1,4-butylene) triamine and N,N-di-(2-aminoethyl)ethylene diamine.

Other useful α,ω diamines include alicyclic diamines such as 1,4-di-(aminomethyl) cyclohexane and heterocyclic nitrogen compounds such as N-amino-alkyl piperazines of the general formula:

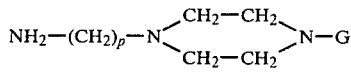

wherein G is an omega-aminoalkylene radical of from 1 to 3 carbon atoms and p is an integer of from 1 to 4. An example of such an amine is N,N'-di-(2-aminomethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene groups, forming such compounds as diethylene triamine, triethylenetetramine, tetraethylene pentamine and isomeric piperazines. Low cost poly(ethylene amines) compounds having a composition approximating tetraethylene pentamine are available commercially under the trade name Polyamine 400. Still other polyamines separated by hetero atom chains such as polyethers or sulfides can be used.

Multifunctionalization (imidization) Process

Step A. The grafted polymer, preferably in solution, can be readily reacted with said t-amino-amine having one primary amino group and mixtures thereof by admixture together and heating at a temperature of from about 100° C. to 250° C. for from 10 minutes to 30 hours, preferably 10 minutes to 10 hours, usually about 15 minutes to about 3 hours. Removal of water assures completion of the imidation reaction. From 0.1 to 0.9, preferably 0.4 to 0.6, molar equivalent of said t-amino-amine based on the grafted dicarboxylic acid moiety content, is used. For example, with an ethylene-propylene copolymer of about 40,000 ($\overline{M}_n$), i.e. a thickening efficiency of about 2.1, and averaging 4 maleic anhydride ride groups, from about 1.6 to 2.4 moles of N-(3-amino) propyl morpholine is preferably used per mole of grafted copolymer.

Step B. This portion of the process provides for reaction of the remaining dicarboxylic acid groups from the graft with the α,ω diamine, i.e. from 0.1 to 0.9 mole equivalent, is then reacted with the product from Step A according to the process conditions of Step A. It is preferred to use 0.1 to 0.9 mole, more preferably 0.4 to 0.6 mole, of the α,ω diamine per mole of remaining grafted maleic anhydride. The reaction of diethylene triamine with the grafted ethylene-containing polymer occurs in 15 minutes or less at 170° C. with a nitrogen blanket.

ACYLATION REACTION

The imidization reaction product is readily reacted with the organic acid anhydride to achieve amidation of the imidized grafted ethylene copolymer obtained from the reaction of the poly(primary amines).

Suitable organic acid anhydrides include: the anhydride of a monocarboxylic acid represented by the structure

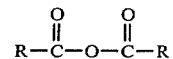

wherein R is selected from an alkyl, substituted alkyl, cycloalkyl, substituted cycloalkyl, alkenyl, substituted alkenyl, aryl, substituted aryl or heterocyclic radical and a substituted heterocyclic radical and can contain from 1 to 30 carbon atoms.

For the anhydrides of the monocarboxylic acids, the anhydrides of the following acids are representative.

(a) Aliphatic monocarboxylic acids (i) Where R is an alkyl or substituted alkyl radical, i.e. acetic acid, fluoroacetic acid, propionic acid, betachloropropionic acid, butyric acid, isobutyric acid, nitroisobutyric acid, valeric acid, isovaleric acid, hexanoic acid, heptanoic acid, 2-ethylhexanoic acid, nonanoic acid, decanoic acid, dodecanoic acid, undecanoic acid, tetradecanoic acid, hexadecanoic acid, heptadecanoic acid, octadecanoic acid, eicosanoic acid, docosanic acid and triacontanoic acid.

(ii) Where R is an alkenyl or substituted alkenyl radical, i.e. butenic acid, pentenic acid, hexenic acid, teracrylic acid, hypogeic acid, oleic acid, elaidic acid, linoleic acid, alpha-eleostearic acid, beta-eleostearic acid, alpha-linolenic acid, acrylic acid, betachloroacrylic acid, methacrylic acid, crotonic acid, isocrotonic acid, 3-butenoic acid, angelic acid, senecioic acid, hydrosorbic acid, sorbic acid and 4-tetradecenoic acid.

(b) Alicyclic monocarboxylic acids.

Cyclopropanecarboxylic acid, cyclopentane-carboxylic acid, cyclohexanoic acid, hydrocapric acid, chaulmoogric acid, naphthenic acid, 2,3,4,5-tetrahydrobenzoic acid and cyclodecanecarboxylic acid.

(c) Aromatic monocarboxylic acids.

Benzoic acid, 1-naphthoic acid, 2-naphthoic acid, o-toluic acid, m-toluic acid, p-toluic acid, o-chlorobenzoic acid, m-chlorobenzoic acid, p-chlorobenzoic acid, 2,3-dibromobenzoic acid, 3,4-dichlorobenzoic acid, o-nitrobenzoic acid, m-nitrobenzoic acid, p-nitrobenzoic acid, 2,3-dinitrobenzoic acid, salcylic acid, m-hydroxybenzoic acid, p-hydrobenzoic acid, gallic acid, anisic acid, phenylacetic acid and beta-phenylpropionic acid.

(d) Heterocyclic monocarboxylic acids.

Picolinic acid, nicotinic acid, furylacrylic acid, piperic acid, indoxylic acid, 3-indoleacetic acid, cinchoninic acid, furoic acid, 2-thiophenecarboxylic acid, 2-pyrrolecarboxylic acid, 9-acridancarboxylic acid, quinaldic acid, pyrazionic acid and antipyric acid.

The amidation of the imide grafted ethylene copolymer which imidization reaction was preferentially carried out in a mineral oil solution can be preferentially conducted as a continuation of the second imidization reaction by subsequently injecting the organic acid anhydride directly into the system. If desired, amidation can be a separate non-integrated reaction step. A sufficient amount of the organic acid anhydride is introduced into the heated solution containing the imidized grafted ethylene copolymer and the reaction carried on for a period of 0.25 to 8 hours at a temperature ranging from 50° to 250° C., a temperature of about 100° to 200° C. being preferred. In order to fully complete the reaction, it is useful to utilize a slight excess, i.e. 1 to 30, more usually about 1 to 10, percent by weight of the injected anhydride. The entire reaction is carried out under an inert atmosphere, for example, a nitrogen blanket and the referenced organic acid byproduct removed from the system by sparging or other means in order to complete the reaction. With a low boiling acid, e.g. acetic acid, this is accomplished by nitrogen sparging.

The amidation process step is preferentially conducted on an imidized graft ethylene copolymeric mineral oil solution wherein the excess $\alpha,\omega$ diamine, e.g. diethylene triamine is reduced to a level of less than about 0.05., optimally less than about 0.02, weight percent free (unreacted) amine.

The amidation reaction can be monitored by differential infrared analysis of the reaction medium. Differential infrared analysis involves absorption comparison of a sample of the starting material placed in the reference beam with a test sample placed in the sample beam using matched cells. It has been found that amidation results in the development of maximum absorption at an amide band of 1650–1670 cm$^{-1}$ whereas the acid absorption band of between 1720 and 1740 cm$^{-1}$ first increases and then decreases as the reaction is completed since the excess anhydride and acid byproducts responsible for acid absorption are depleted through removal. The best method of monitoring completion of the amidation of the imide grafted ethylene copolymer is to continue the reaction until absorption at the 1650–1670 cm$^{-1}$ band is at a maximum.

Illustrative of such differential I.R. monitoring of the reaction is the following Table I which shows the varying levels of absorption for the amide and acid bands during amidization with acetic acid anhydride.

Table I

| Reaction Time (Min.) | Absorbance | |
|---|---|---|
| | Amide Peak 1650 cm$^{-1}$ | Acid Peak 1720 cm$^{-1}$ |
| 0 | 0 | 0 |
| 15 | .078 | .10 |
| 30 | .143 | .162 |
| 60 | .189 | .170 |
| 120* | .181 | .237 |
| 180 | .176 | 0 |
| 240 | .164 | 0 |

*reaction at ~120° C. believed completed and sparging with nitrogen initiated.

Haze-Treating Step

The mineral oil additive composition containing the ethylene copolymer dispersant additives usually contain from about 0.1 to about 50 wt.% based upon the total weight of the hydrocarbon solution of the amidated-imidated, grafted ethylene copolymer additive. In some instances, these oil additive compositions are found to be hazy because they contain a hazing material derived from homopolymerization of the grafted moieties and/or low molecular weight polar species insoluble in oil. It is therefore useful to treat the composition according to the process of U.S. Pat. No. 4,144,181, i.e., by adding at least a haze removing amount of an oil-soluble acid having a pK of less than about 2.5, e.g., an alkylbenzene sulfonic acid.

It has been found useful to carry out the haze removing process by treating said copolymer containing oil composition with said oil-soluble acid in an amount within the range of from about 0.1 to about 2.5 molar equivalents of oil-soluble acid per molar equivalent of haze material. Preferably said acid is added in an amount of 1 equivalent of haze. A molar equivalent of haze material is measured by reference to the total molar amount of polyfunctional material which reacts with said grafted copolymer, e.g. one mole of said material equals one molar equivalent of haze material.

The treatment of the haze containing oil composition is carried out at a temperature of about room temperature to about 250° C., preferably from about 150° to about 200° C. and for a time period of about 0.1 hour up to about 20 hours, preferably from 0.5 to about 3 hours. The oil-soluble acid preferably has a pK of from about 0.001 to about 2.5, optimally from about 0.1 to about 2. The term pK for the purpose of this disclosure is used herein to express the extent of the dissociation of the acid used to treat the haze causing substance. Thus, pK can be defined as the negative logarithm to the base 10 of the equilibrium constant for the dissociation of the oil-soluble strong acid.

Useful acids which eliminate the hazing property of the hazing substance are represented by oil-soluble derivatives of alkyl carboxylic acids such as isostearic acid, maleic acid, malonic acid, phosphoric acid, thiophosphoric acids, phosphonic acid, thiophosphonic acids, phosphinic acid, thiophosphinic acids, sulfonic acid, sulfuric acid, sulfinic acid and alpha-substituted halo- or nitro- or nitrilo-carboxylic acids wherein the oil solubilizing group or groups are hydrocarbyl and containing from about 3 to about 70, preferably from about 18 to 40, optimally 25 to 32 carbon atoms.

Particularly preferred for use in this invention for treating the hazing substance are the oil-soluble sulfonic acids which are typically alkaryl sulfonic acids. These alkylaryl sulfonic acids generally have from 9 to 76, preferably 24 to 46, total carbons. The alkyl substituent or substituents preferably have 18 to 40, optimally 24 to 32, total carbons.

Especially preferred alkyl mono-aryl sulfonic acids are those acids that are formed by alkylating benzene with oligomers of propylene or $C_4$–$C_{10}$ 1-alkenes containing 20 to 40 carbon atoms and thereafter sulfonating the resulting alkylate. The class of compounds may thus be identified as the polyalkyl benzene sulfonic acids. An especially preferred compound is a $C_{28}$–$C_{32}$ alkyl benzene sulfonic acid having a ($\overline{M}_n$) of about 550.

A wide range, e.g. 0.001 to 50 wt.%, preferably 0.005 to 20%, of the oil-soluble nitrogen and/or oxygen containing graft polymers treated in accordance with this invention can be incorporated into about a major amount of an oleaginous material, such as a lubricating oil or hydrocarbon fuel. When used in lubricating oil compositions, e.g., automotive or diesel crankcase lubricating oil, the treated polymer concentrations are within the range of about 0.01 to 20 wt.%, e.g., 0.1 to 15.0 wt.%, preferably 0.25 to 10.0 wt.%, of the total composition. The lubricating oils to which the products of this invention can be added include not only hydrocarbon oil derived from petroleum, but also include synthetic lubricating oils such as esters of dibasic acids and complex esters made by esterification of monobasic acids, polyglycols, dibasic acids and alcohols.

The amidated-imidated graft polymers of the invention may be commercialized and/or utilized in a concentrate form, e.g., from about 10 wt.% to about 50 wt.%, preferably 15 to 49 wt.%, in oil, e.g., mineral lubricating oil, for ease of handling.

The above concentrates and lubricating oil compositions may contain other conventional additives, such as dyes, pour point depressants, antiwear agents, antioxidants, other viscosity-index improvers, dispersants and the like.

The following examples illustrate more clearly the process of the present invention. However, these illustrations are not to be interpreted as specific limitations of this example.

DESCRIPTION OF THE PREFERRED EMBODIMENTS

Practice of this invention may be illustrated by the following examples which show how the invention may be utilized. In these examples, as elsewhere in this specification, all parts are by weight unless specifically indicated otherwise and all nitrogen were determined by Kjeldahl analysis.

EXAMPLE 1

Preparation of Ethylene-Propylene Succinic Anhydride Copolymer

An oil concentrate (220 lbs.) of about 15% ethylene-propylene copolymer (2.1 TE) was charged into a 50 gal. reactor, heated to 121° C. under nitrogen and sparged (nitrogen) for 1 hr. Maleic anhydride (3.795 lbs.) was added to the stirred reactor and the temperature raised to 171° C. At 171° C., Lupersol 130 (0.95 lbs.) was added and stirring continued for 1.5 hr. Finally, the reaction was sparged with nitrogen for 1.5 hrs. to remove any unreacted maleic anhydride.

EXAMPLE 2

Ethylene-Propylene Copolymer Succinimide of Mixed Alkylene Amino Amide and Alkyl Morpholino Sulfonate An oil concentrate (1800 g) of about 15% ethylene-propylene succinic anhydride copolymer (0.281 mole grafted maleic anhydride) and S100N oil (801 g) was placed into a four-necked five-liter flask under a nitrogen blanket. The solution was heated to 170° C. with good stirring and reacted with n-aminopropyl morpholine (NAPM) (24.2 g; 0.168 mole; 60% of available anhydride groups) for 30 min. The infrared indicates imide carbonyl at 1710 cm$^{-1}$ and anhydride carbonyl at 1790 cm$^{-1}$. The solution was next reacted with diethylenetriamine (DETA) (11.4 g; 0.112 mole 40; of available anhydrides) and stirred for 30 min. The IR shows only imide carbonyl present. The stirred solution was then reacted with acetic anhydride (12.6 g) at 170° C. under a nitrogen blanket followed by a heavy nitrogen sparge for 2.0 hr. Finally, the solution was treated with an oil solution of 120 g of a mineral oil solution of 22 wt.% $C_{28}$-$C_{32}$ alkylbenzene sulfonic acid having a ($\overline{M}_n$) of about 550 and stirred for 30 minutes. The final nitrogen on copolymer analyzed at 1.05 wt.% and on the oil concentrate obtained with 10 wt.% copolymer in oil analyzed at 0.3 wt.%.

EXAMPLE 3

Ethylene Propylene Copolymer Succinimide of an Alkylene Amine

An oil concentrate (1800 g) of about 15% ethylene-propylene suffinic anhydride copolymer (0.281 mole grafted maleic anhydride) and S100N oil (801 g) was placed into a four-necked five-liter flask under a nitrogen blanket. The solution was heated to 170° C. with good stirring and reacted with diethylenetriamine (19.1 g; 0.281 moles) and stirred. In less than 30 minutes the reaction solution became highly viscous so that it was not susceptible of stirring and the reaction terminated.

EXAMPLE 4

An oil concentrate (150 lbs.) of about 15% ethylene-propylene copolymer (2.1 T.E.) was charged into a 50 gal. reactor, heated to 121° C. under nitrogen and sparged with nitrogen for 1 hr. Maleic anhydride (2.59 lbs.) was added to the reactor over a 15 min. period and the temperature was raised to 171° C. At 171° C., Lupersol 130 (0.698 lbs.) was added, stirring continued for 1.5 hr. and followed by nitrogen sparging for 1.5 hr. At this time, N(3-amino) propyl morpholine (NAPM) (2.72 lbs.) was added and stirring was continued for 1 hr. The reaction was then treated with 8.8 g of a 22.5% oil solution of $C_{28}$-$C_{32}$ alkyl benzene sulfonic acid of ($\overline{M}_n$) about 550. Stirring was continued for 30 min. and, finally, S130N low pour oil (64.3 lbs.) was used to dilute the reactor contents to a final a.i. of 10.5%.

EXAMPLE 5

The utility of the inventive additives were measured by comparing the products of Examples 2 and 4 and a commercially available dispersant to a standard engine test of blended formulations containing these additives. A 10W40 SAE crankcase oil formulation was made up using 10.8 wt.% of the oil concentrate of Example 2, 3 wt.% of an ashless dispersant additive, 1.1 wt.% of an overbased magnesium sulfonate, 1.3 wt.% of overbased calcium phenate, 1.6 wt.% of an antioxidant, and 1.8 wt.% of a zinc dialkyldithiophosphate and a mineral lubricating oil blend of base stocks. For comparison purposes, two other test formulations were made up in the same manner by replacing the oil concentrate of Example 2 with an amount of the oil concentrate of Example 4 or Lubrizol 3702, a commercially available lubricating oil dispersant additive sold by Lubrizol Corp. of Cleveland, Ohio and believed to be an alkanol ester of a styrene-maleic anhydride copolymer having a ($\overline{M}_n$) greater than 50,000 sufficient to provide two 10W40 SAE oil formulations. The above formulation with the oil concentrate of Example 2 was tested in the Sequence V-C Engine Test, which is described in "Multicylinder Test Sequences for Evaluating Automotive Engine Oils," ASTM Special Technical Publication 315F, page 133ff (1973). The V-C test evaluates the ability of an oil to keep sludge in suspension and prevent the deposition of varnish deposits on pistons, valves, and other engine parts. The test result is shown in Table II.

TABLE II

| MS-VC Test Results | | | |
|---|---|---|---|
| | Piston Skirt | | Total |
| | Sludge | Varnish | Varnish |
| Oil with Product of Ex. 2 | 9.5 | 8.3 | 8.0 |
| Passing Criteria for test | 8.5 | 7.9 | 8.0 |

In the above tests, the ratings are on a scale of 0 to 10, with 0 being an excessive amount of sludge and varnish while 10 being a completely clean engine. The test result shows that the products of the invention have utility as multifunctional viscosity index improver additives for lubricating oils.

Thus, the invention can be described as a composition comprising an oil-soluble ethylene copolymer having a number average molecular weight ($\overline{M}_n$) ranging from 700 to 500,000 (preferably 10,000 to 250,000) and from 2 to 20 (preferably 4 to 10) average grafted imido moieties per molecule, from 10 to 90 mole percent of said imido moieties being nitrogen substituted with an alkylene t-amine substituent and the remainder of said imido moieties being nitrogen substituted with an alkylene (preferably alkylene polyamine) $C_1$–$C_{30}$ acyl amidate.

The invention in its broader aspect is not limited to the specific details shown and described and departures may be made from such details without departing from the principles of the invention and without sacrificing its chief advantages.

What is claimed is:

1. A lubricating oil composition comprising a major amount of a lubricating oil having dissolved therein at least a viscosity index improving amount of an oil-soluble ethylene polymer viscosity index improver having dispersancy properties and containing in the range of from about 0.001 to 8 wt. % of nitrogen, which improver is an ethylene copolymer comprising about 30 to 80 wt. % ethylene and about 20 to 70 wt. % $C_3$ to $C_{28}$ alpha olefin, grafted with an ethylenically unsaturated acid material selected from the group consisting of unsaturated dicarboxylic acids and anhydrides of dicarboxylic acid, wherein about 10 to 90% of the grafted dicarboxylic acid groups are reacted with a tertiary amino amine having a single primary amine group to react with the dicarboxylic acid moieties to form imido linkages, and wherein the substantial remainder of said dicarboxylic acid groups are reacted with $\alpha,\omega$ primary diamine of 2 to 60 carbons and 2 to 12 nitrogens and having at least two primary amine groups, wherein essentially one of said primary amine groups is reacted with an acid moiety of said grafted ethylene copolymer, and the other of said primary amine groups is reacted with an anhydride of an organic acid having a $C_1$ to $C_{30}$ hydrocarbyl group to thereby stabilize the resulting ethylene polymeric viscosity index improver and inhibit viscosity increase of said oil composition upon aging.

2. A composition according to claim 1, wherein said $C_3$ to $C_{28}$ alpha olefin is propylene, said ethylenically unsaturated acid material is maleic anhydride, said tertiary amino amine is a morpholine derivative, said diamine is a polyethyleneamine, and said anhydride is acetic anhydride.

3. A composition according to claim 1, wherein said viscosity index improver is prepared by solution grafting said ethylenically-unsaturated dicarboxylic acid material onto said copolymer comprised of ethylene and at least one $C_3$–$C_{28}$ alpha-olefin at a temperature of from about 100° C. to about 250° C., in the presence of a high-temperature decomposable free-radical initiator having a boiling point in excess of about 100° C., to provide an average of from 2 to 20 of said grafted dicarboxylic acid groups, which grafted polymer (a) is firstly reacted with said t-amino-amine compound having a single primary amine in an amount ranging from 0.1 to 0.9 equivalent based on the amount of dicarboxylic acid material grafted onto said ethylene copolymer, (b) then secondly reacting the remaining unreacted dicarboxylic acid material with said $\alpha,\omega$ primary diamine having at least two primary amine groups and (c) thirdly thereafter reacting the product of said first two reactions with said $C_1$ to $C_{30}$ organic acid anhydride.

4. A composition according to claim 3 wherein said dicarboxylic acid material is maleic acid anhydride, said t-amino-amine is N-(3-amino propyl) morpholine and said $\alpha,\omega$ diamine is a poly(alkylene amine) and said organic acid anhydride is present during the reacting in an amount of from about 0.5 to 2.5 moles of an organic acid anhydride per primary amino group.

5. A composition according to claim 4 wherein said copolymer is of ethylene and propylene having from about 38 to 70 wt.% of ethylene and is present in said composition in an amount ranging from about 0.1 to about 15 wt.%, said poly(alkylene amine) is diethylene triamine, said anhydride is acetic anhydride and said alkylene polyamine is reacted in an amount ranging from 0.4 to 0.6 molar equivalent based on the amount of said grafted maleic acid anhydride.

6. An oil-soluble product which is an ethylene-$C_3$ to $C_{28}$ alpha-olefin copolymer having a number average molecular weight ($\overline{M}_n$) ranging from 700 to 500,000 and an average from 2 to 20 grafted succinimido moieties per molecule, from 10 to 90 percent of said succinimido moieties being nitrogen substituted with an alkylene t-amine substituent and the remainder of said succinimido moieties being nitrogen substituted with an alkylene amine terminating in a primary amine group which has been reacted with a $C_1$ to $C_{30}$ hydrocarbyl acid anhydride.

* * * * *